Figure 13:
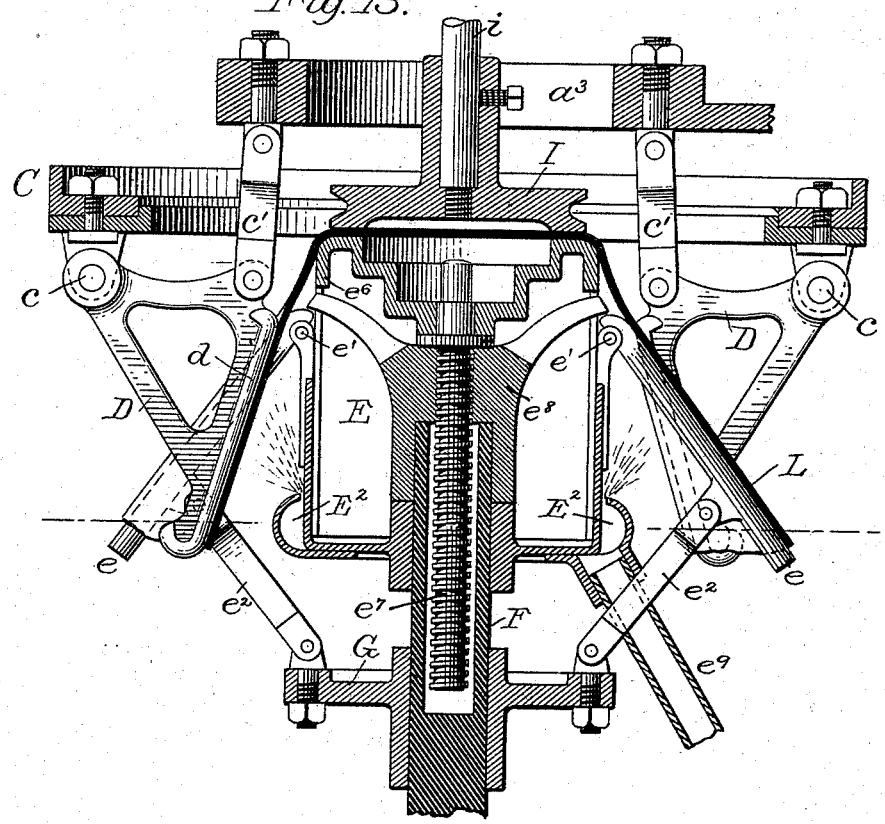

(No Model.) 5 Sheets—Sheet 1.
R. EICKEMEYER.
HAT STRETCHING MACHINE.
No. 527,271. Patented Oct. 9, 1894.
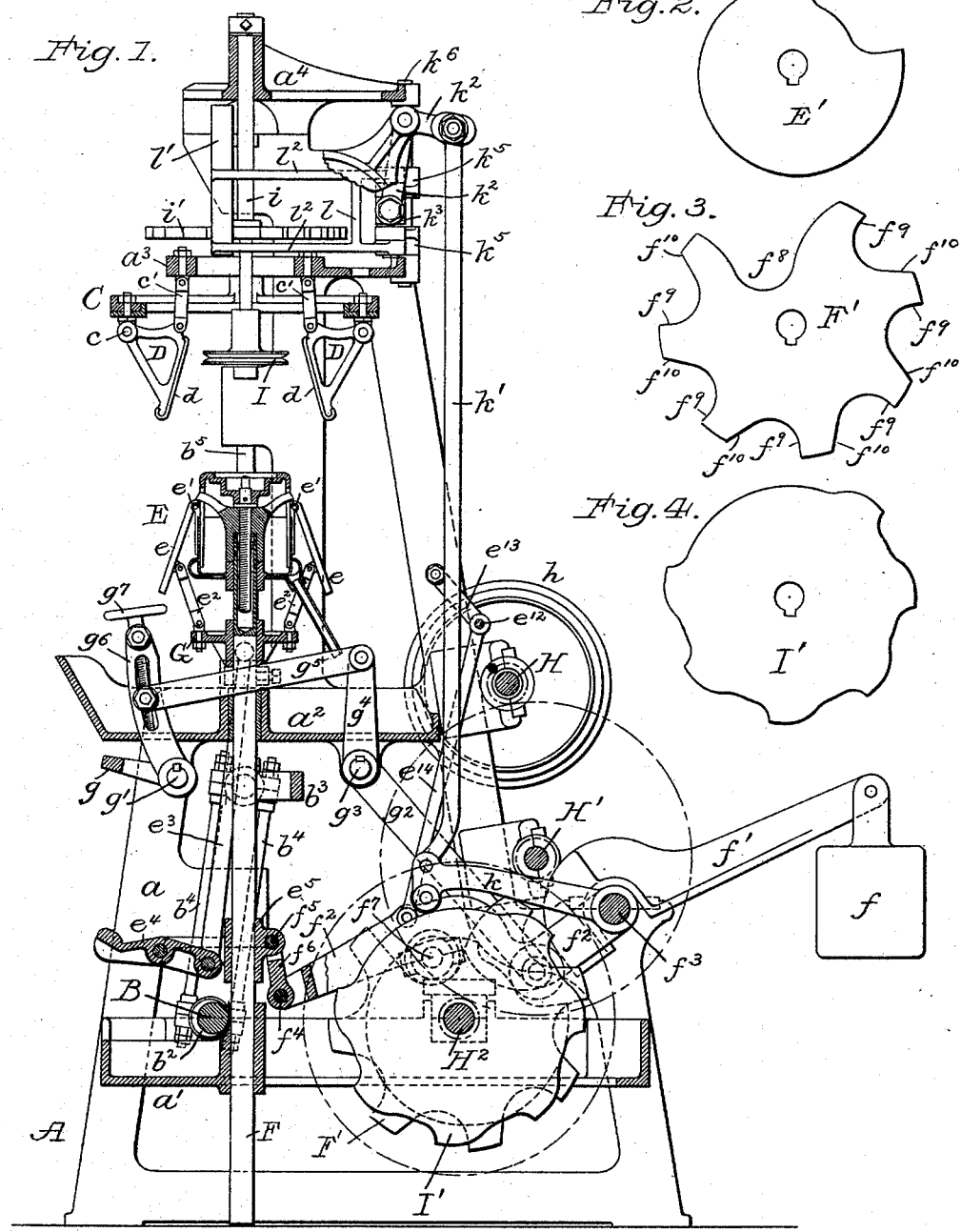
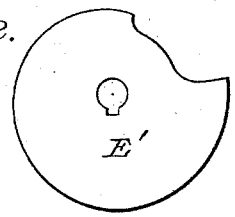
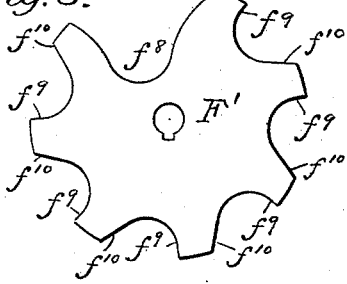
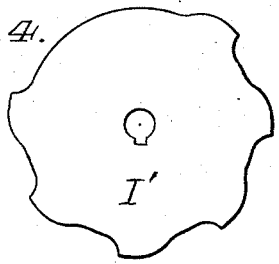
Attest:
Howell Bartle
Emma E. Marks
Inventor:
Rudolf Eickemeyer
By [his attorney]

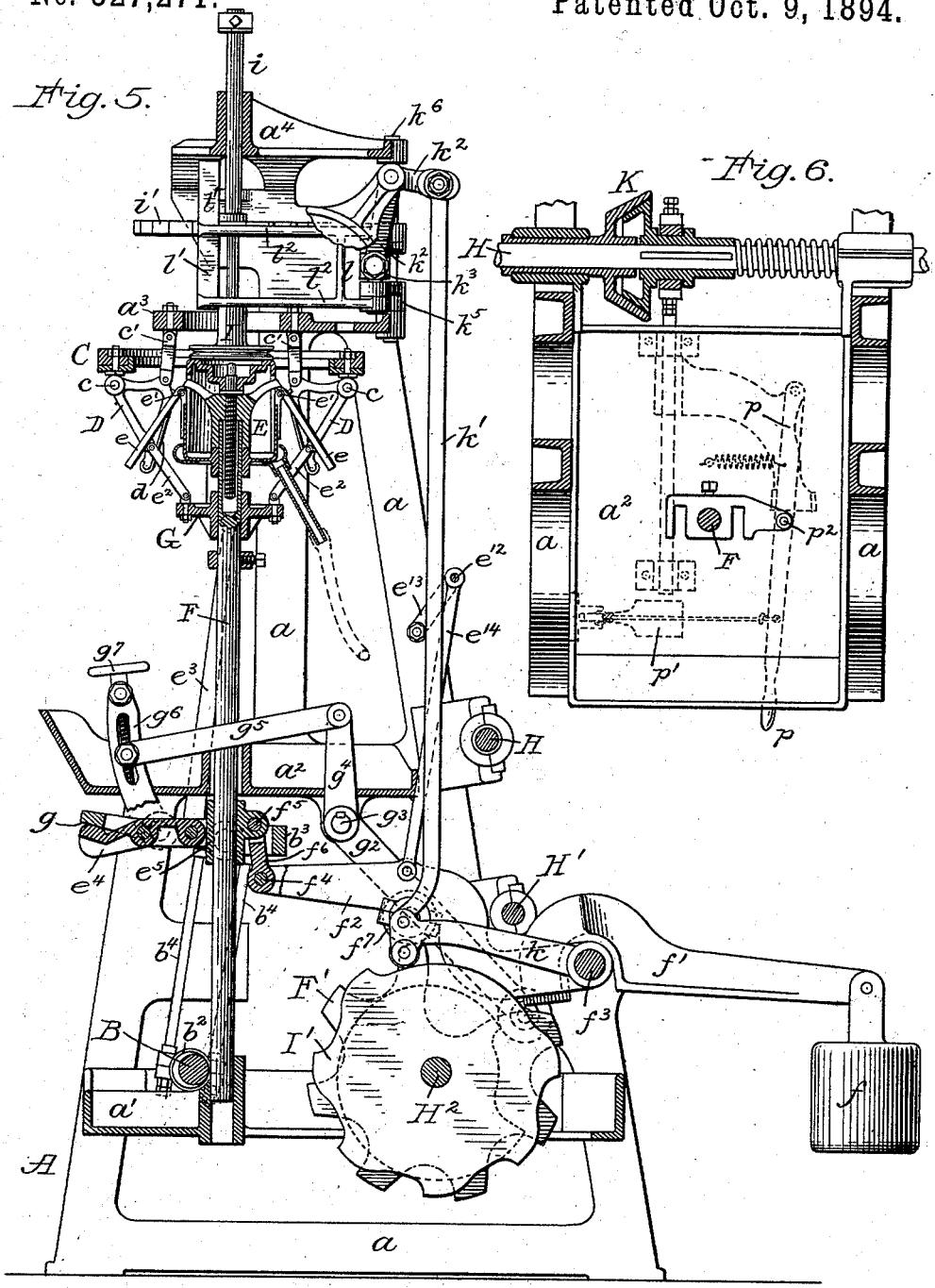

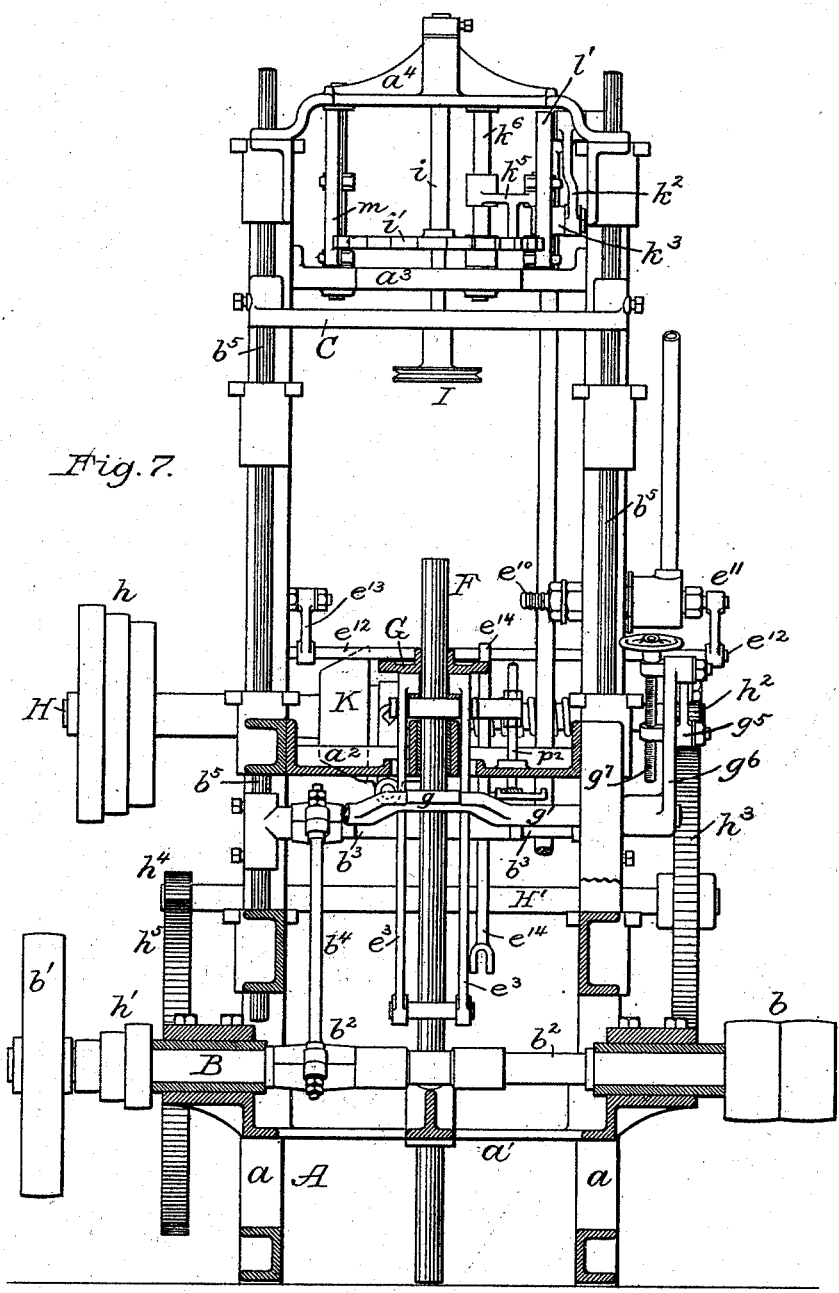

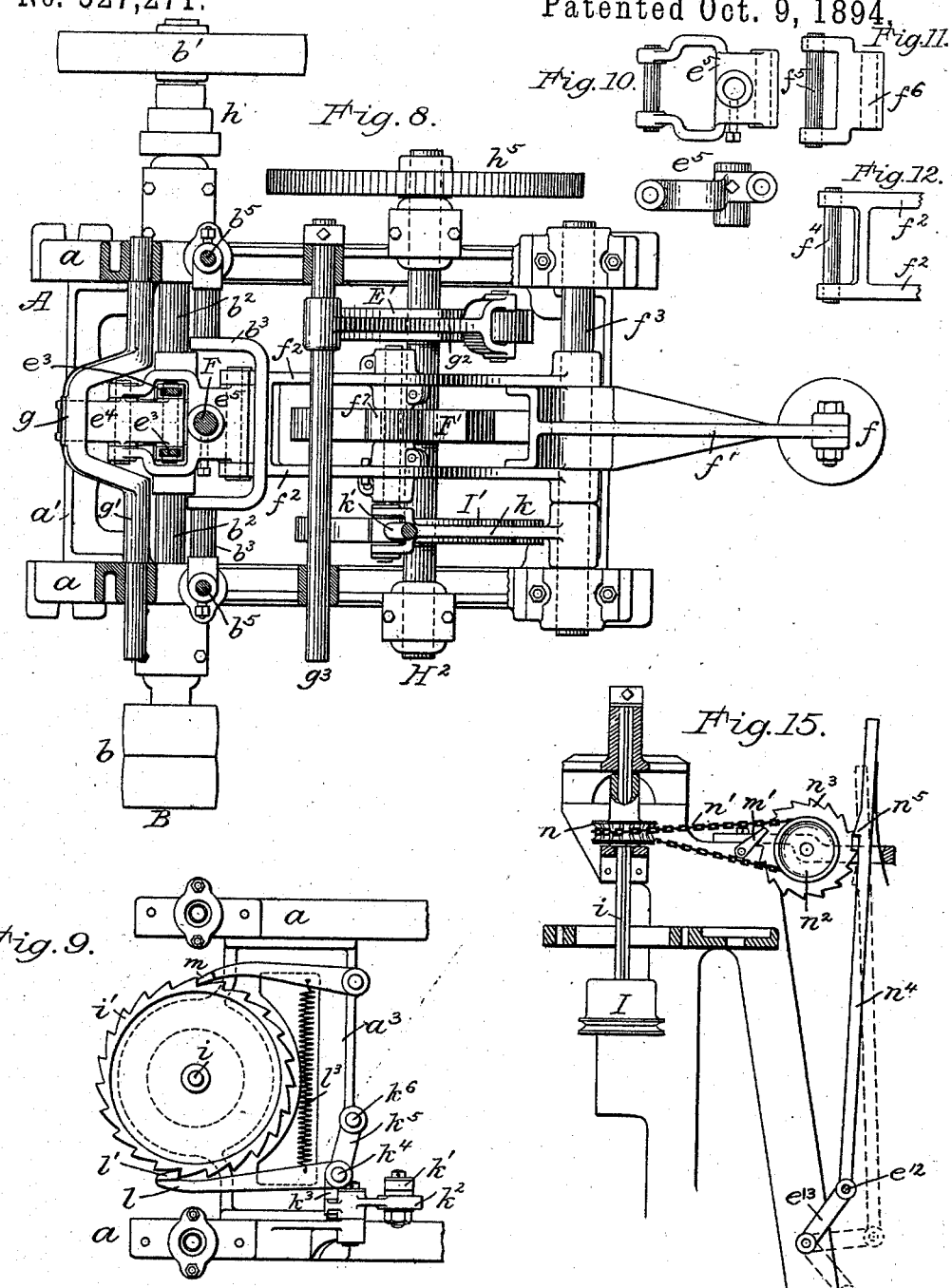

(No Model.) 5 Sheets—Sheet 5.

R. EICKEMEYER.
HAT STRETCHING MACHINE.

No. 527,271. Patented Oct. 9, 1894.

Attest:
Howell Bartle
Emma E Marks

Inventor:
Rudolf Eickemeyer
By
Attorney

United States Patent Office.

RUDOLF EICKEMEYER, OF YONKERS, NEW YORK.

HAT-STRETCHING MACHINE.

SPECIFICATION forming part of Letters Patent No. 527,271, dated October 9, 1894.

Application filed June 15, 1894. Serial No. 514,644. (No model.)

*To all whom it may concern:*

Be it known that I, RUDOLF EICKEMEYER, of Yonkers, in the county of Westchester and State of New York, have invented certain new and useful Improvements in Hat-Stretching Machines; and I do hereby declare that the following specification, taken in connection with the drawings furnished and forming a part of the same, is a clear, true, and complete description of the several features of my invention.

Machines embodying my present invention, contain automatically vibrated brim stretching fingers annularly arranged, and a former, having not only a hat supporting shell, but also a series of stretching ribs, which intervene between and co-operate with the stretching fingers, for stretching hat bodies on the corrugation principle, and although these elements, broadly considered, have been employed in machines as heretofore devised by, and patented to me, said elements have now been more or less changed and reorganized, with special reference to their effective co-operation with novel accompanying mechanism, which in itself involves much substantial utility.

The main object of my present invention, is to provide a thoroughly effective and reliable automatic brim stretching machine, which will be within the means of numerous hat manufacturers, from whose shops my prior automatic brim stretching machines have been practically precluded, because of their complicated and consequent expensive construction, and in accomplishing that end, I have also secured greater rapidity in operation, with consequent increased capacity.

An essential feature in an automatic brim stretcher, is a capacity for rotating or turning a hat body while upon its vertically moved supporting device, or former, so that fresh portions of the hat brim may be fed to, or presented for contact with, the automatically operated vibrating stretching fingers, and their co-operating stretching ribs. In my prior automatic brim stretching machines, rotation was accomplished, by applying the rotative power to the brim portion of the hat body, and therefore reliance was had upon conical ribs, which served not only as stretching devices but also as hat turning rolls. I have now devised means, whereby the hat rotating power is applied to the tip of the hat body, and said power is communicated thereto from the top of the machine to a pendent disk, which bears upon or clamps the tip of the hat body, and is rotated, only when its brim is free from the action of, and control by, the vibrated stretching fingers, and also when free from contact with the stretching ribs. This freeing action, is afforded by a lowering movement of the former from its highest position for a short distance, this movement and a prompt return, being repeated several times, between the initial complete raising, and the final lowering of the former, to its lowest position, and during the intervals between said short movements, the former is maintained at its highest position, so that a hat body thereon will be presented to the co-operative action of the overlying rapidly reciprocating stretching fingers, and the underlying stretching ribs, which are parts of the former. This intermittent dropping and raising of the former, is a feature peculiar to my new machines, and it has value, even if the rotation of the hat should be effected by hand, and especially, when the former is provided with such a rotative hat supporting shell, as has been employed in some of my prior machines.

In my prior automatic brim stretching machines, I provided for vertically advancing the former with the conical rotative stretching ribs, during the operation of the vibrated stretching fingers, but in my present machine, I employ hinged ribs on the former, and automatically swing them outwardly, for gradually increasing their capacity to co-operate with the vibrating stretching fingers, in proportion to the progress of the brim stretching operation, thus securing automatically, a movement of the hinged ribs which was accomplished by a hand lever, in certain of my prior brim stretching machines, wherein automatically vibrated stretching fingers, were co-operatively employed with a hinged rib former which was raised and lowered by a treadle actuated by the foot of the operator; and said spreading movement of hinged ribs, in certain other of my prior machines, was accomplished by the rotation by the operator, of a hand wheel, said ribs being parts of a former which had no hat shell, and which was automatically lifted for co-operation with stretching fingers, which were not automatically vibrative.

In certain of my prior hat stretching machines, wherein the former was automatically lifted and lowered, I provided for the delivery of steam to the former, (for heating hats) by means of a pendent pipe, secured to and parallel with the spindle on which the former was carried, said spindle being hollow at its top and said pipe being arranged to slide through a vertical steam chamber, so as to receive steam through ports in the pipe, only after the former and the pipe had been properly lifted, so as to locate said port or ports within said chamber.

In my present machine, I have provided the former with a steam chamber, and supplied it from an adjacent fixed pipe by way of flexible tubing, and the steam supply is controlled at the fixed pipe, by a rotative cock which is automatically actuated by link connections, preferably coupled to the levers by which the former spindle is lifted and lowered, thus enabling me to utilize the interior of the spindle at its top, as a chamber for a screw by which the hat shell is adjusted, and to obviate that expenditure of power, as well as the well known difficulties, attendant upon the use of sliding pipes, telescoped steam joints, and duplicated stuffing boxes.

In hat stretching machines wherein the former has been automatically lifted and lowered, quite heavy strains occur at the pivotal connections, uniting the lifting levers with the spindle of the former, and as heretofore constructed, rapid wear has ensued with consequent lost motion and shocks. Said connections have heretofore consisted of screw shanked bolts at the spindle cross head, but I have now introduced a broad link between the lifting levers, and the cross head of the spindle, and coupled said link with the levers and cross head, by means of cylindrical joint pins, which afford an extensive journal surface, and not only assure durability, but also obviate the shocks incident to loosening at the joints, as when screw bolt pivots are employed, all of which although of general value, is specially important in these machines, because during the stretching of a hat therein, the former spindle is quickly lifted, once wholly, and then partially lowered and lifted six times, and then fully lowered, whereas in my prior machines the spindle is raised and lowered but once, during the stretching of a hat. After fully describing one of my new machines in detail, and certain modifications, the features deemed novel will be duly specified in the several clauses of claim hereunto annexed.

Figure 14:
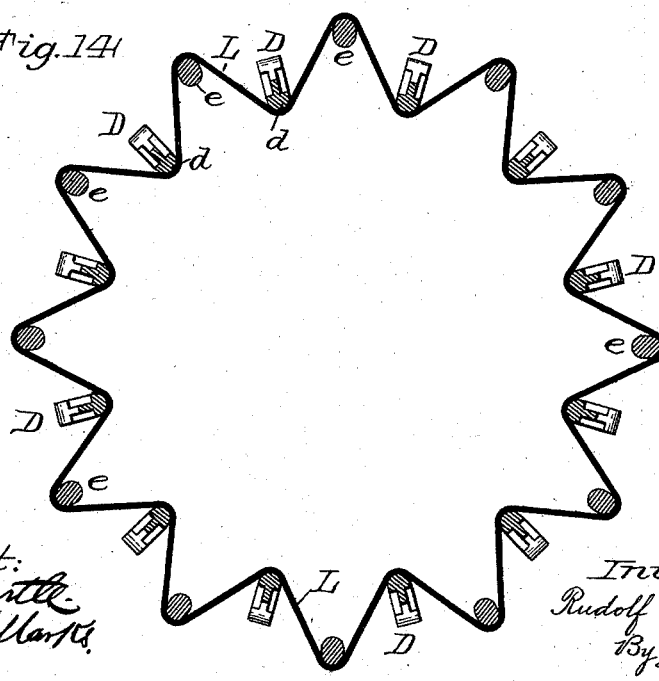

Referring to the drawings, Figure 1. illustrates one of my machines in vertical central section, with the former in its lowest position, ready to receive a hat body. Fig. 2. is a side view of a cam, which controls the spreading of the ribs on the former. Fig. 3. is a side view of the cam which actuates the former spindle. Fig. 4. is a side view of the cam which controls the hat turning mechanism in this machine. Fig. 5. is a central vertical section of the machine, with the former and stretching ribs in co-operative position. Fig. 6. illustrates the stopping mechanism. Fig. 7. illustrates the heavy portions of the machine, partially in front view, and partially in vertical section. Fig. 8. illustrates the lower portion of the machine in plan view, on a section line below the middle plate. Fig. 9. is a top view of the upper portion of the machine with the cap plate removed, and illustrating the hat turning mechanism. Figs. 10, 11, and 12. illustrate respectively, the spindle cross head or plate; the link to be coupled to said cross head, and the adjacent end of the spindle lifting lever, and their cylindrical joint pins. Fig. 13. is an enlarged view of the hat stretching devices, in co-operative relation, a hat body being interposed between the fingers and ribs, and steam emerging from the steam chamber. Fig. 14. is a cross section through the hat body, the stretching fingers and stretching ribs, on dotted line indicated in Fig. 13. Fig. 15. illustrates in side elevation and section, another organization for turning the hat body.

The frame of the machine may be variably constructed, provision being made for proper strength and rigidity, and for mounting therein the several bearings. As here shown, the frame A, includes two side plates $a, a$, and four intermediate lateral plates, as follows: one near the bottom, as at $a'$; a middle plate as at $a^2$; a top plate, as at $a^3$, and a cap plate, as at $a^4$, these being firmly united by suitable bolts, to the side plates.

The driving shaft B, is located adjacent to the bottom plate $a'$, near the front of the machine, and it is provided with fast and loose pulleys, at $b$, and a balance wheel $b'$. This shaft also serves as a rapidly driven eccentric shaft, having near each bearing, an eccentric, as at $b^2, b^2$, (instead of cranks as heretofore) and these are coupled to a cross head $b^3$, by double rod links or pitmen $b^4, b^4$, said cross head being rigidly coupled to vertically reciprocating slide rods $b^5, b^5$, which are provided with guide bearings on the side plates $a, a$, and between the two upper bearings, said rods are secured as by bolts, to an annular finger plate C, which is thereby rapidly reciprocated.

In my prior machines, the slide rods $b^5, b^5$, have been separately coupled to their pitmen, but I have now rigidly coupled said rods together by the cross head $b^3$, thus rendering them capable of being smoothly operated at high speed, and with a minimum liability of wear and derangement, the main shaft being driven at least four hundred and fifty revolutions per minute.

The brim stretching fingers D, are each triangular in outline, and usually twelve in number, annularly arranged, and all are pendently pivoted to the annular finger plate C, as at $c$, and their fulcra, are links $c'$, suspended from, and pivoted to the top plate $a^3$, all as clearly indicated in Fig. 1, so that, as heretofore the reciprocation of the finger plate C, simultaneously vibrates the several fingers of the set, and causes their working faces $d$ to swing toward and from a common center. In this portion of my machine, I have secured a specially smooth and effective operation, by connecting the links $c'$, to the stationary top plate $a^3$, and directly pivoting the fingers as at $c$, to the reciprocating annular finger plate C, as distinguished from my prior machines, wherein the said link couplings were either interposed between a movable fulcrum plate and the fingers, or between said fingers and the reciprocating finger plate. These vibrated stretching fingers, co-operate as heretofore with a ribbed "former" E, which is mounted upon a vertically reciprocating spindle F. This former, embodies a set or series of annularly arranged ribs $e$, twelve in number, and each co-operates with two appropriate stretching fingers, by being alternated between them, but at the opposite or under side of the brim of a hat body when interposed and in position to be stretched, as fully illustrated in Figs. 13 and 14. Each rib is pivoted at its upper end, as at $e'$, to the body or cylindrical portion of the former, and so also is each finger near its lower end, pivotally connected to a freely sliding cross head G, on the usual central spindle F, by means of links $e^2$, so that when said cross head is raised, independently of the spindle, the lower ends of the ribs are swung outwardly, thus increasing the co-operative stretching capacity of the fingers and ribs, and also providing for a progressive operation. The ribs are actuated by means of parallel links or rods $e^3$, $e^3$, connected to a horizontal lever $e^4$, which is fulcrumed upon a cross head or sleeved plate $e^5$, secured to, and movable vertically with the spindle F, so that although said lever, the former and the cross head G, move together at times, the latter may be raised independently of the spindle, as when the outer end of said lever $e^4$, is depressed, as will be hereinafter more fully described.

Upon rearward extensions of the middle frame plate, a counter shaft H, is mounted, having at one end a set of cone pulleys, as at $h$ which are belted to, and driven by smaller cone pulleys, as at $h'$, on the main or driving shaft B. The opposite end of said counter shaft, carries a small pinion $h^2$, which meshes with a larger spur gear $h^3$, on one end of a parallel idler shaft H', which at its opposite end, carries a small pinion $h^4$, in mesh with a large spur gear $h^5$, at one end of a parallel cam shaft H², at the rear of, and in the same plane with, the main shaft.

The slidable spindle F, is counter balanced, by means of a weight $f$, on an arm $f'$, which is an extension of a spindle lifting lever having two parallel arms $f^2$, $f^2$, fulcrumed on a horizontal bar or rod $f^3$, and coupled at its inner end, by means of cylindrical joint pins $f^4$, $f^5$, and a broad link $f^6$, (Figs. 1, 5, 10, 11, and 12) to the cross head or hub plate $e^5$, before described as being secured to the spindle F. These joint pins are non rotative, being secured at their ends respectively, in their seats in levers $f^2$, $f^2$, and in the ears of the upper end of the link $f^6$, thus affording the extensive journal surface, hereinbefore referred to. As is well known, the lower portions of these machines are constantly exposed to dripping water, and hence these coupling points are specially liable to corrosion and undue wear, which renders these joint pins of special value. This lever $f^2$, $f^2$, is provided between its arms with a lateral shaft and a roller, as at $f^7$, which latter by its contact with a cam F', on the cam shaft H², causes the spindle and former to be lifted and lowered. As shown in Fig. 1, the roller $f^7$, is in the stop seat $f^8$, on the cam, as at the beginning and termination of each round of the stretching operation.

The cam F', (shown separately in Fig. 3,) has six lifting faces $f^9$, in addition to the initial long lifting face at the one side of the deep stop seat $f^8$, there being of course, corresponding intervening drop faces as at $f^{10}$, with alternating peripheral resting faces, concentric with the axis. This cam F', thus constructed, provides for lifting, the former to its proper height, (about eleven inches,) and during each round, it drops the former about four inches, and raises it, six times, thus freeing the hat from the fingers, to admit of its being rotated during each depression, the ribs in the meantime being also contracted.

The gradually expansive action of the ribs $e$, of the former E, by way of the lever $e^4$, (when the spindle F, is elevated, as hereinbefore mentioned,) is effected by the abutting contact of the top of the outer end of the lever $e^4$, with the coincident or lower portion $g$, of the outer end of a bow shaped rock shaft $g'$, and this contact point $g$, is variably located by means of a scroll cam E', on the cam shaft H², separately shown in Fig. 2. This cam E', has a scroll working face, so that it gradually swings and lifts the lower end of an arm $g^2$, provided with a roller for contact with the cam, and thereby imparts a slow rotative motion to a rock shaft $g^3$, provided with an arm $g^4$, (Fig. 1) which is coupled by a link $g^5$ to a vertical arm $g^6$, which imparts rotative motion to the bow shaped rock shaft $g'$, which affords the abutting contact at $g$, and with which, the outer end of the lever $e^4$, engages, when the hat former is lifted. The link $g^5$, is adjustably coupled to the arm $g^6$, by means of a hand wheel screw $g^7$, the latter being a rotative fixture on the arm $g^6$, and having a nut which is pivoted to the link $g^5$, so that by turning the screw, the arm $g^6$, may in substance, be lengthened or shortened, and thus enable the abutting contact at $g$, to be variably located and moved, and thereby cause the ribs $e$, of the former to be variably expanded. This former E, is unlike any which has been heretofore devised in many particulars. It is provided with a hat supporting shell $e^6$, which is vertically adjustable and capable of free rotation, as heretofore, so as to enable a hat to be automatically rotated, for presenting fresh surfaces to the action of the stretching devices, as will be hereinafter further described.

The hat shell $e^6$, is mounted upon the collar of a central screw $e^7$, which is tapped into a threaded nut or sleeve $e^8$, having two or more arms at its top which project through slots in the side of the hat shell, thus rotatively connecting said sleeve and shell. The sleeve $e^8$, is loosely mounted on top of the spindle F, and is free to rotate thereon, and it serves as a base upon which the hat shell, can be adjusted to any desired height of hat crown, by rotating the screw $e^7$. The body of the former, to the top of which the ribs $e$, are hinged or pivoted, has at its lower end, an annular steam chamber $E^2$, which discharges steam upwardly beneath and against the hat L, in an annular jet, as indicated in Fig. 13, and is provided with an induction pipe $e^9$, which is coupled by a flexible tube, (shown in dotted lines,) to the nozzle of a steam pipe, at $e^{10}$, (Fig. 7,) which is provided with an automatically controlled cock, at $e^{11}$, which is operated as follows: The arm of the cock $e^{11}$, at its outer end, is engaged by one end of a horizontal rod $e^{12}$, which at the other end, is supported by an arm $e^{13}$, pivoted on the inner side of the opposite frame plate, Figs. 1, 5 and 7. This rod $e^{12}$, is coupled by a link $e^{14}$, to one of the arms of a two armed lever, by which the spindle F, is lifted, so that, when the former is elevated, steam is fully supplied thereto, and then partially cut off, when the former is partially lowered, as during its short movements, and fully cut off when wholly lowered.

The rotative hat shell, within a cylindrical shell which serves as the foundation to which expansive stretching ribs are pivoted, constitutes a valuable novelty in hat stretching machines.

In my prior machines, steam was automatically controlled by means of a telescoped steam pipe, which was attached to the spindle, and was reciprocated vertically therewith, which involved certain obvious disadvantages which are wholly obviated, by the novel combination with the former, of flexible steam tubing, and the steam cock, automatically controlled as described.

In operating with prior machines, the hat bodies were either rotated by hand, or automatically, by means of rotative stretching ribs, (as disclosed in my Letters Patent No. 256,305, dated April 11, 1882,) which involved much expensive complication, which is now wholly obviated, because I have now organized with the hinged stretching ribs and rotative hat shell, novel hat rotating mechanism, which is located above, and apart from, although in co-operation with, the former, when properly lowered away from engaging contact, with the constantly vibrated stretching fingers. Above the former, and axially in line with the spindle F, and coincident with the top of the hat shell, there is a suspended disk I, which, while it may perform the duty of a hat tip weight as in my prior machines, its prime duty now, is to serve as an important part of the novel hat rotating mechanism, which I have now devised. This disk I, is mounted upon the lower end of a vertical shaft $i$, slidable in bearings afforded by the top and crown plates of the frame, and having a ratchet wheel $i'$, rigidly secured thereto, between said plates, so that said disk instead of being a weight as heretofore, may if desired be made, of wood, or other light material well suited to frictionally engage with felt, because of the weight afforded by the shaft and ratchet wheel. This disk is preferably provided with a groove, as shown, for enabling its face to be covered with felt or cloth and thus secure effective frictional contact with a hat body. An intermitting rotative movement, is imparted to the disk I, by way of the ratchet wheel, and it is immaterial to the end sought, by what means rotative power may be communicated to the disk from any suitable moving portion of the machine, provided it be applied when the hat body is free, as when the former has been so far lowered, as to release the hat body from the stretching devices.

As here shown, in Figs. 1, 4, 5, 7, and 9, power is communicated to the disk I, as follows: An arm $k$, pivoted on the rod on which the lever $f^2$, $f^2$, is fulcrumed, is provided at its free end, with a roller, which rests upon the edge of a cam I', on the cam shaft $H^2$, this arm $k$, connected by a link $k'$, with a bell crank lever $k^2$, mounted on a stud at the top of one of the side plates of the frame. The bell crank lever $k^2$, carries on its pendent arm, a short, lateral, vertically slotted arm $k^3$, which loosely embraces a vertical rod $k^4$, which is carried by one end of an H shaped link $k^5$, hinged upon or to a vertical swivel post $k^6$, seated at its two ends in the top and crown plates of the frame. Hinged upon the vertical rod $k^4$, there is a pawl $l$, having a long vertical ratchet engaging bar $l'$, (because the ratchet wheel moves up and down with the spindle of the disk I,) provided with two parallel arms $l^2$, each having at its rear end, a hub or sleeve which is occupied by the pawl rod $k^4$. This working pawl is coupled by a retractile spiral spring $l^3$, with a stop pawl $m$, which as usual, prevents a backward movement of the ratchet wheel, during the sliding forward movement of the pawl bar $l'$, over the teeth of the ratchet wheel. The organization thus described, causes the disk I, to be slightly rotated, and by its frictional contact with the tip of a hat body, the latter is rotated when supported on the rotative hat shell, and free from contact with the stretching ribs and fingers. This mode of operation for rotating hat bodies while on a hat stretching former, being absolutely new, and of substantial value, I do not intend to restrict this portion of my invention to this particular mechanical organization, although I shall make specific claim thereto, so far as relates to providing a special actuating cam, this being the most reliable mode of securing the required motion, and at proper times, because, as will be seen in Fig. 1, the working faces of the cam I', are located opposite the centers of the concavities in the face of the cam F', which actuates the former spindle.

In Fig. 15, I have shown another arrangement of ratchet and pawl mechanism, for intermittingly rotating the hat turning disk. In this arrangement, the hat disk I, is heavier than the first, and its spindle or shaft $i$, is freely splined, so as to slide in the hub of a chain wheel $n$, which is coupled by a suitable chain $n'$, to a chain wheel $n^2$, on the axis of a ratchet wheel $n^3$, provided with a stop pawl $m'$. A vertically reciprocating pawl bar $n^4$, is coupled at its lower end to the arm $e^{13}$, (or rod $e^{12}$.) The bar $n^4$, has a pawl tooth $n^5$, which engages with the ratchet wheel $n^3$, during a portion of each short downward movement of the pawl bar, as during the swinging reciprocations of the steam cock arm, these movements corresponding in time, with the short vertical reciprocations of the former spindle, the parts being so organized, that the ratchet wheel will be actuated one tooth, between the time the former has been lowered, say two inches from its highest position, to the end of its four inch drop. After each cycle, the pawl bar moves to its lowest position, and resumes its duty, after having been again elevated.

As the machine is wholly automatic, it is provided with a stop motion, which is like that in some of my prior machines, and is specially shown in Fig. 6. A friction clutch K, on the counter shaft H, is controlled by a spring shipper lever $p$, which in turn is controlled by a treadle $p'$, for starting the machine, and said lever is depressed for stopping the machine by means of a vertical stop pin $p^2$, carried on a bracket projecting from the spindle F, below the former, as shown in Fig. 7.

The operation of one of my machines, constructed and organized as described, is substantially as follows: It will be assumed that power is so applied, as to impart to the main or driving shaft, four hundred and fifty revolutions per minute, and that the counter shaft is belted by way of the middle faces of the two cones, the larger and smaller portions of the counter shaft cone pulley, affording such time variations in the round of operations as may be desired. The counter shaft being out of service, until clutched, the remainder of the machine would be at rest, and the former at its lowest position. A hat body having a previously stretched tip is taken from an adjacent hot water or steaming kettle, and placed upon the former, the supporting shell having been properly adjusted, as to the height of the crown, the brim portions being thereby properly located with relation to the stretching ribs, on the former. The friction clutch is then set, or operated, by way of the treadle, whereupon the cam shaft commences its rotation. The former with the hat body thereon, is promptly lifted about eleven inches, so that its ribs occupy co-operative relations with the rapidly vibrated stretching fingers, the ribs on the former being then but slightly expanded. In a few seconds, the former is dropped about four inches, thus freeing the hat body from the stretching devices and also contracting the ribs, and immediately thereafter, the hat is slightly rotated, whereupon the former is again lifted, and the stretching operation resumed, the former ribs being all the while slowly expanded. The hat is thus successively stretched, dropped, rotated and raised, six times, and the cam shaft, having completed its rotation, the stop motion operates, the hat body having been well and thoroughly stretched, in about (23) twenty three seconds. The hat body is maintained in fine condition for stretching, by the supply of steam thereto, which is automatically delivered at all times, while the former is within say three inches of its highest position, and the steam is automatically cut off when the former is lowered.

It will be obvious, that the stretching fingers and ribs would be in like manner co-operative, if the fingers were only vertically vibrated, and the ribs expansible, as for instance if the finger plate and a fulcrum plate were coupled together and simultaneously reciprocated; also if the finger plate slide rods should be uncoupled from their pitmen, and secured against vertical movement in their bearings, in which case said fingers and these ribs would be co-operative; so also if the finger plate should be organized, so that while vibrating, the fingers would gradually close inwardly, as in some of my prior machines, in which case the ribs would not need to be expansible, and it will be readily seen that my novel hat turning mechanism would co-operate with the hat stretching devices, regardless of their special mode of co-operation, so long as they perform their duty upon the well known corrugation principle.

Having thus described my invention, I claim as new and desire to secure by Letters Patent—

1. The combination in a hat stretching machine, of co-operating stretching fingers, and ribs; a rotative hat supporting shell; a rotative disk which clamps the tip of a hat body between it and said shell; means for automatically separating the stretching devices for freeing the hat body from their engaging contact, and means which intermittingly rotate said disk and shell, for automatically rotating the hat body at proper intervals in the operation of the stretching devices, and presenting fresh portions of the hat body thereto.

2. The combination with co-operating sets of hat stretching devices, of a rotative hat supporting shell; a rotative disk coincident with and adapted to bear upon and clamp the tip of a hat body carried on said shell; and a rotating cam, operatively coupled by intermediate mechanism with said disk, for rotating it step by step, and changing the position of the hat body with relation to the stretching devices.

3. In a hat stretching machine, the combination substantially as hereinbefore described, of stretching fingers, a slidable spindle, a rotative hat supporting shell, and stretching ribs carried on said spindle independently of said shell; a lever coupled at one end to said spindle, and an operating cam beneath said lever, provided with a stop seat at which the spindle is maintained at its lowest position, also with a lifting face by which the spindle is raised to its highest position, also with a series of concave faces, by each of which, the spindle is partially lowered from, and raised to its highest position, also a series of intervening peripheral working faces, and a retiring face, which fully lowers said spindle into its stop seat.

4. In a hat stretching machine, the combination substantially as hereinbefore described, with a former carried by a vertically reciprocated spindle, and having expansible stretching ribs, of a rotating cam, provided with working faces as described, which impart to the former spindle its extreme lifting and lowering movements, and also a series of intervening vertical reciprocations from its highest position, and a scroll cam, which automatically causes the stretching ribs to be gradually expanded during the entire hat stretching operation.

5. The combination with a ribbed former, and automatic mechanism for expanding its stretching ribs, of a hand wheel screw, which controls an adjustable pivotal connection between portions of the expanding mechanism, and is accessible at the front of the machine, for enabling an operator to accurately adjust the expanding mechanism, and to vary the strain of the stretching devices upon a hat body.

6. In a hat stretching machine, a ribbed former composed of a cylindrical hollow shell, stretching ribs hinged to the outside of said shell near its top, and an annular steam chamber, at the base of said shell, adapted to discharge steam upwardly, in combination with a rigid pipe mounted in the machine, a flexible intermediate steam pipe, and a cock for controlling the supply of steam required during the stretching operation, for heating hat bodies carried by the former.

7. In a hat stretching machine, the combination with a former, and its supporting spindle, of a lever, and cam, for actuating said spindle, a steam pipe flexibly connected with said former, and a steam cock, automatically operated, by a link connected with said lever, substantially as described, whereby the supply of steam will be varied according to the position of the former, and its relation to the overlying stretching devices.

RUDOLF EICKEMEYER.

Witnesses:
HOWELL BARTLE,
EMMA E. MARKS.